US011393156B2

(12) United States Patent
Saleh et al.

(10) Patent No.: US 11,393,156 B2
(45) Date of Patent: Jul. 19, 2022

(54) PARTIALLY RESIDENT BOUNDING VOLUME HIERARCHY

(71) Applicant: Advanced Micro Devices, Inc., Santa Clara, CA (US)

(72) Inventors: Skyler Jonathon Saleh, San Diego, CA (US); Fataneh Ghodrat, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 108 days.

(21) Appl. No.: 16/819,014

(22) Filed: Mar. 13, 2020

(65) Prior Publication Data

US 2021/0287422 A1    Sep. 16, 2021

(51) Int. Cl.
| | |
|---|---|
| *G06T 15/06* | (2011.01) |
| *G06K 9/62* | (2022.01) |
| *G06T 1/60* | (2006.01) |
| *G06T 15/00* | (2011.01) |
| *G06T 17/10* | (2006.01) |

(52) U.S. Cl.
CPC ............ *G06T 15/06* (2013.01); *G06K 9/6279* (2013.01); *G06T 1/60* (2013.01); *G06T 15/005* (2013.01); *G06T 17/10* (2013.01)

(58) Field of Classification Search
None
See application file for complete search history.

(56) References Cited

U.S. PATENT DOCUMENTS

| | | | | |
|---|---|---|---|---|
| 8,471,845 | B1* | 6/2013 | Stich | G06T 15/06 |
| | | | | 345/426 |
| 8,502,819 | B1* | 8/2013 | Aila | G06T 15/06 |
| | | | | 345/426 |
| 9,965,888 | B2 | 5/2018 | Shin et al. | |
| 2014/0022237 | A1 | 1/2014 | Aila et al. | |
| 2016/0078588 | A1 | 3/2016 | Garanzha | |

(Continued)

FOREIGN PATENT DOCUMENTS

KR    10-2016-0038640 A    4/2016

OTHER PUBLICATIONS

Stich, M., "Introduction to NVIDIA RTX and DirectX Ray Tracing," NVIDIA Developer Blog, https://devblogs.nvidia.com/introduction-nvidia-rtx-directx-ray-tracing/, Mar. 19, 2018 (Retrieved Mar. 13, 2020).

(Continued)

*Primary Examiner* — Michael J Cobb
(74) *Attorney, Agent, or Firm* — Volpe Koenig (57) ABSTRACT

Techniques for performing ray tracing for a ray are provided. The techniques include, based on first traversal of a bounding volume hierarchy, identifying a first memory page that is classified as resident, obtaining a first portion of the bounding volume hierarchy associated with the first memory page, traversing the first portion of the bounding volume hierarchy according to a ray intersection test, based on second traversal of the bounding volume hierarchy, identifying a second memory page that is classified as valid and non-resident, and in response to the second memory page being classified as valid and non-resident, determining that a miss occurs for each node of the bounding volume hierarchy within the second memory page.

20 Claims, 7 Drawing Sheets

(56) References Cited

U.S. PATENT DOCUMENTS

| | | | |
|---|---|---|---|
| 2018/0293784 A1 | 10/2018 | Benthin et al. | |
| 2018/0308273 A1 | 10/2018 | Wald et al. | |
| 2020/0050550 A1* | 2/2020 | Muthler | G06F 12/0875 |
| 2020/0051315 A1* | 2/2020 | Laine | G06T 17/005 |
| 2020/0051316 A1* | 2/2020 | Laine | G06T 15/06 |
| 2021/0117246 A1* | 4/2021 | Lal | G06F 9/5027 |
| 2021/0149716 A1* | 5/2021 | DeCell | G06F 9/30145 |

OTHER PUBLICATIONS

Owen, G. Scott, "Ray—Box Intersection", https://education.siggraph.org/static/HyperGraph/raytrace/rtinter3.htm, Apr. 1, 1998 (Retrieved Mar. 13, 2020).

Hunt, W., "Real-Time Ray Casting For Virtual Reality", https://www.highperformancegraphics.org/wp-content/uploads/2017/Hot3D/HPG2017_RealTimeRayCasting.pdf, 29 pages (Retrieved Mar. 11, 2020).

Hunt, W., et. al., "Hierarchical Visibility for Virtual Reality", Proceedings of the ACM on Computer Graphics and Interactive Techniques, vol. 1, No. 1, Article 8, 18 pgs., May 2018.

* cited by examiner

PARTIALLY RESIDENT BOUNDING VOLUME HIERARCHY

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for performing ray tracing for a ray are provided. The techniques include, based on first traversal of a bounding volume hierarchy, identifying a first memory page that is classified as resident, obtaining a first portion of the bounding volume hierarchy associated with the first memory page, traversing the first portion of the bounding volume hierarchy according to a ray intersection test, based on second traversal of the bounding volume hierarchy, identifying a second memory page that is classified as valid and non-resident, and in response to the second memory page being classified as valid and non-resident, determining that a miss occurs for each node of the bounding volume hierarchy within the second memory page.

Figure 1:
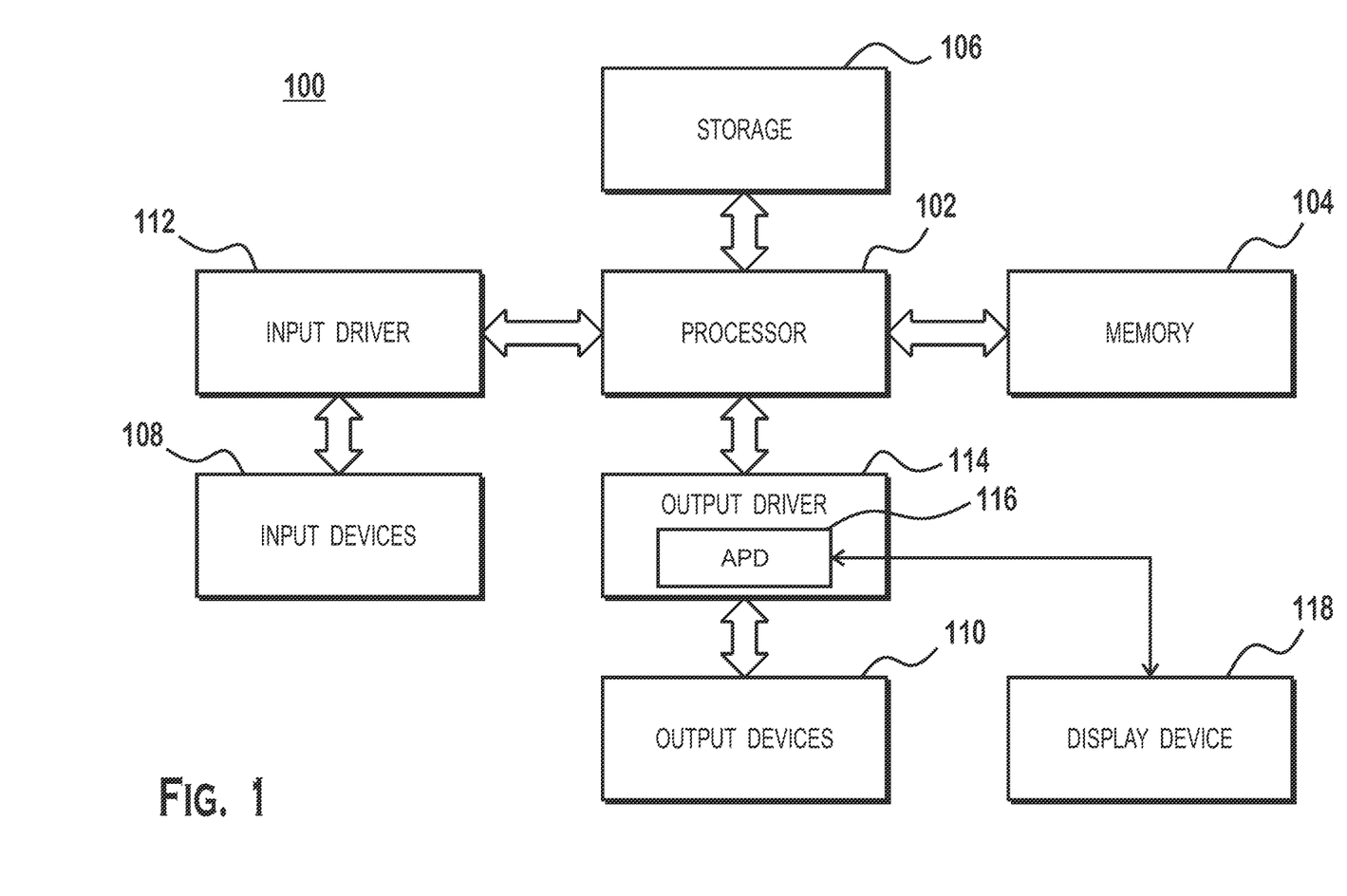
FIG. 1 is a block diagram of an example device in which one or more features of the disclosure are implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated for any processing system that performs processing tasks in accordance with a SIMD paradigm to be configured to perform the functionality described herein. Alternatively, it is contemplated that computing systems that do not perform processing tasks in accordance with a SIMD paradigm performs the functionality described herein.

Figure 2:
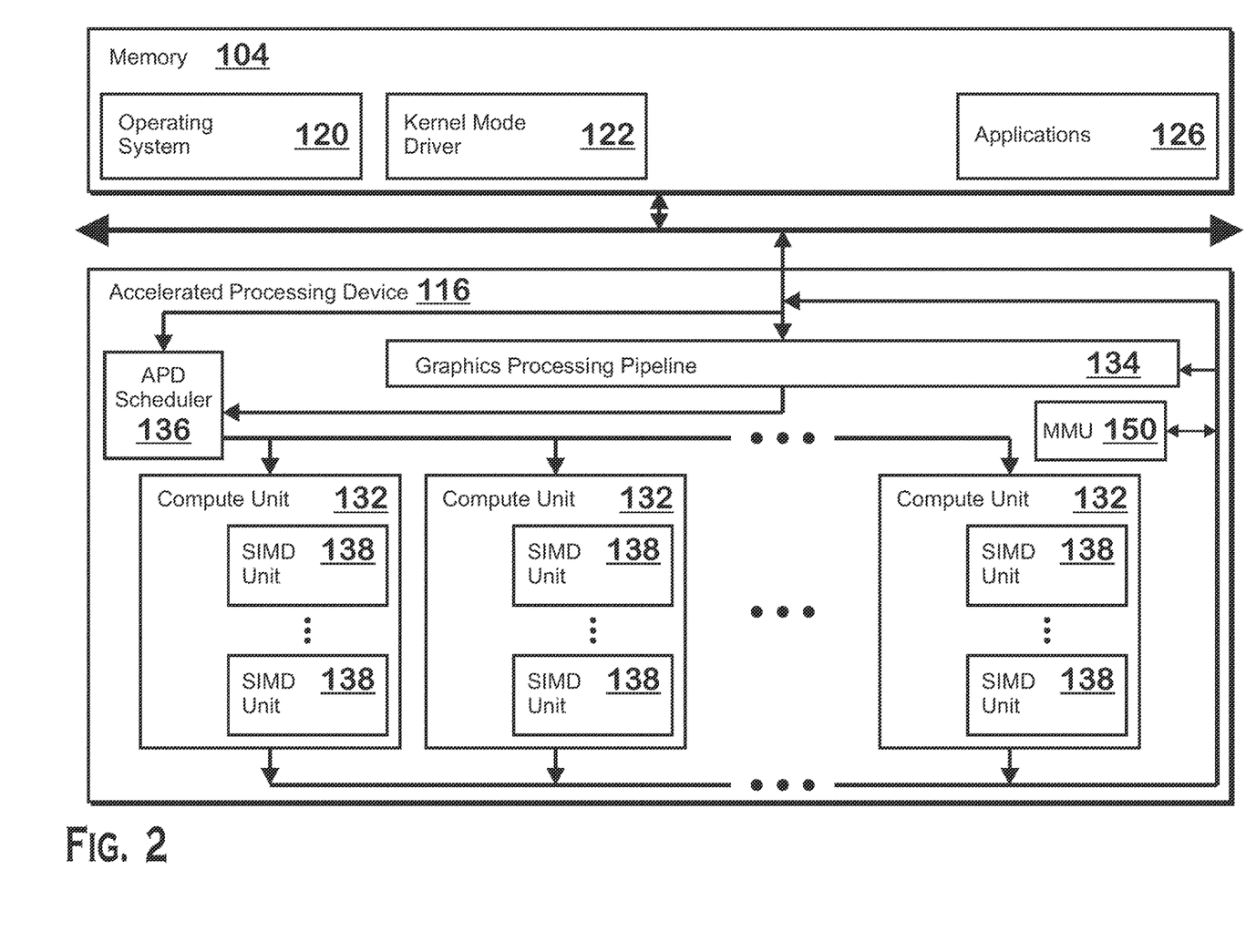
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and also, in some situations, executes other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116 includes one or more memory management units ("MMUs") 150. An MMU handles memory access requests, such as requests for translation from virtual addresses to physical addresses. In various implementations, an MMU 150 includes one or more translation lookaside buffers ("TLB") or interfaces with one or more TLB. A TLB caches virtual-to-physical address translations for quick reference.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
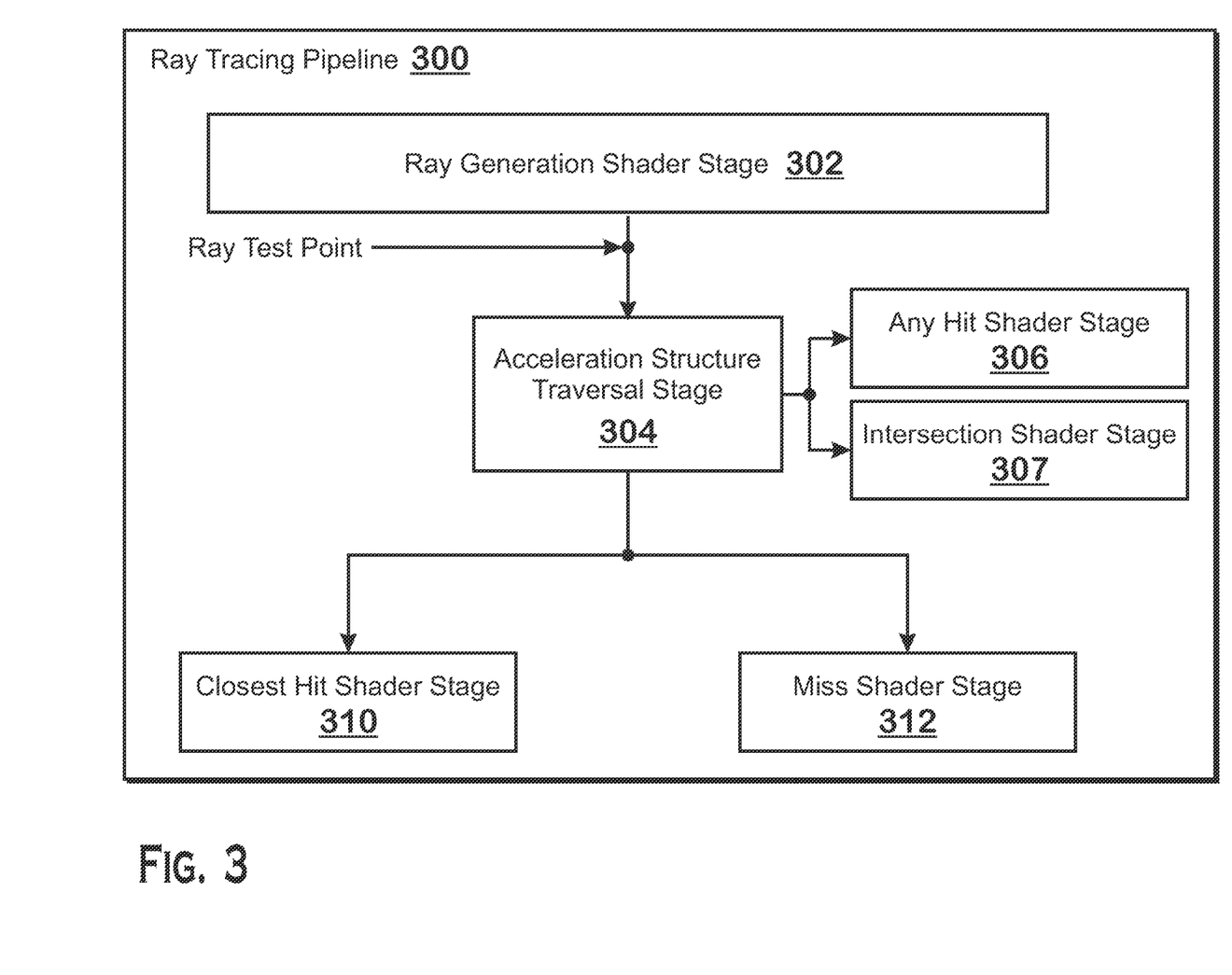
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. In some implementations, a ray generation shader 302, any hit shader 306, intersection shader 307, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). In other implementations, any of the ray generation shader 302, any hit shader 306, closest hit shader 310, and miss shader 312 are implemented as software executed on any type of processor and that performs the operations described herein, circuitry that performs the operations described herein, or a combination of hardware circuitry and software executing on a processor. The acceleration structure traversal stage 304 performs the ray intersection test to determine whether a ray hits a triangle.

The ray tracing pipeline 300 indicates the path through which a ray tracing operation flows. To render a scene using ray tracing, a rendering orchestrator such as a program executing on the processor 102 designates a collection of geometry as a "scene." Various objects in the scene are represented as collections of geometry primitives, which are often triangles, but could be any geometric shape. The term "triangle" when used herein, refers to these geometric primitives that compose a scene. The rendering orchestrator renders the scene by designating a camera position and an image, and requesting rays be traced from the camera through the image. The ray tracing pipeline 300 performs the various operations described herein to determine colors for the rays. Colors are often derived from the triangles that are intersected by the rays. As described elsewhere herein, a ray that hits no triangle invokes a miss shader 312. One possible operation for the miss shader 312 is to color the ray with a color from the "skybox," which is an image that is designated as representing the ambient scene where no geometry is present (for example, a scene with no geometry would render only the skybox). Colors for pixels in the image are determined based on the point of intersection between the ray and the image position. In some examples, after a sufficient number of rays are traced and the pixels of the image have been designated colors, the image is displayed on a screen or is used in some other manner.

In some implementation where the shader stages of the ray tracing pipeline 300 are implemented in software, the other programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware, or as a combination of hardware and software. The ray tracing pipeline 300 is, in various implementations, orchestrated partially or fully in software or partially or fully in hardware, and, in various implementations, is orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing. Although described as executing on the SIMD unit 138 of FIG. 3, it should be understood that in other implementations, other hardware, having or not having SIMD capabilities (e.g., the processor 102), alternatively executes the shader programs of the illustrated ray tracing pipeline 300.

The ray tracing pipeline 300 operates in the following manner. A ray generation shader 302 is performed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers performance of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 "rejects" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency sometimes determines that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that, in various implementations, the closest hit shader 310 and miss shader 312 implements a wide variety of techniques for coloring ray and/or performing other operations. In instances in which these shaders are implemented as programmable shader stages executing shader programs, different shader programs used for the same application are capable of coloring pixels in different ways. The term "hit shader" is sometimes used herein, and refers to one or more of an any hit shader 306, an intersection shader 307, and a closest hit shader 310.

A typical way in which the ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. It is possible for multiple rays to be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques are alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This bounding volume hierarchy is the "acceleration structure" referred to elsewhere herein. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray intersection test can be performed. A non-leaf node is sometimes referred to as a "box node" herein and a leaf node is sometimes referred to as a "triangle node" herein.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
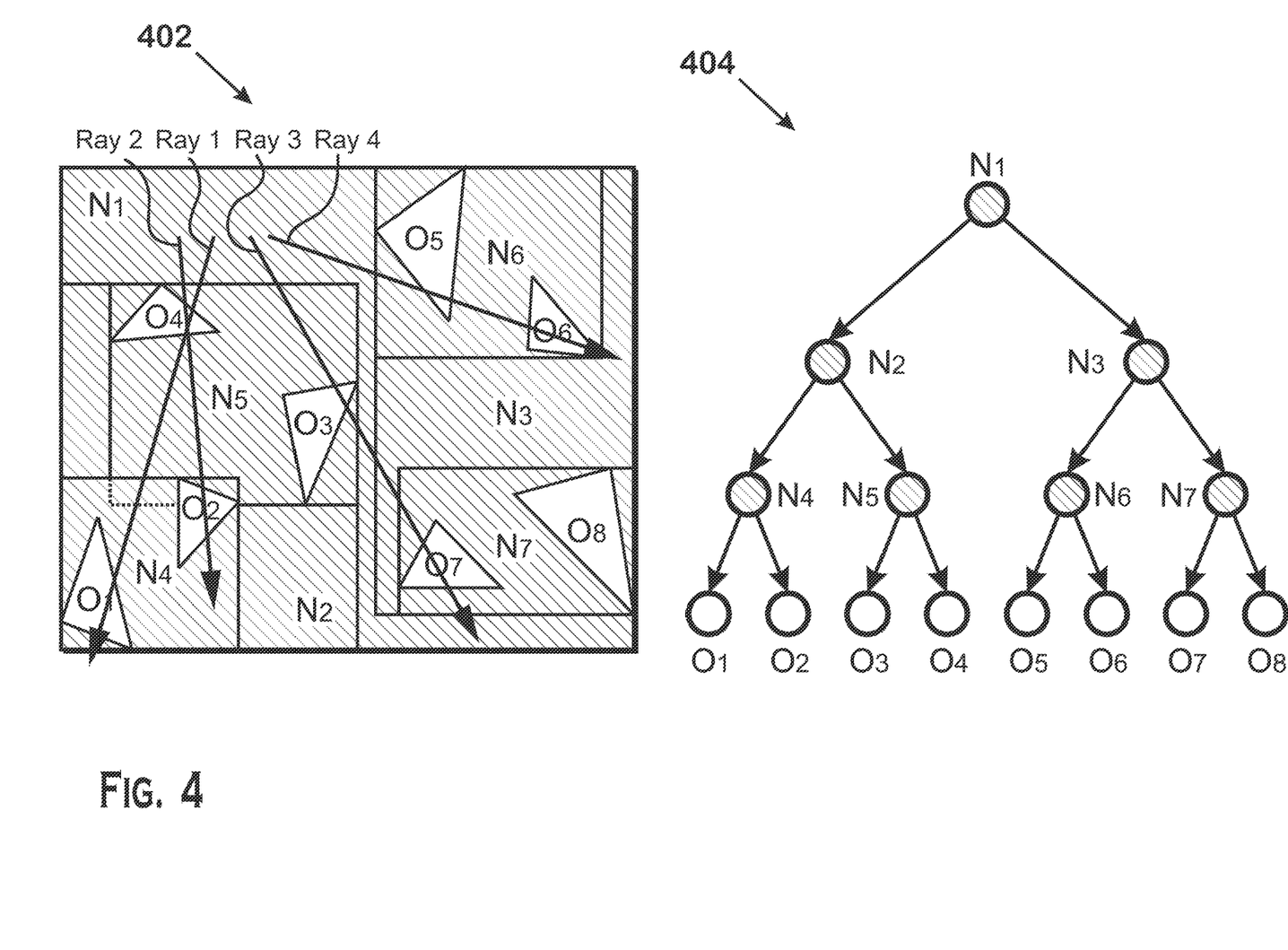
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$ and five box tests ($N_1$, $N_2$, $N_3$, $N_6$, and $N_7$) are performed.

The ray tracing pipeline 300 shoots rays to detect whether the rays hit triangles and how such hits should be shaded. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, the ray tracing pipeline 300 traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of the ray tracing pipeline 300 is now discussed with respect to the example rays 1-4 illustrated in FIG. 4. For each of the example rays 1-4, the ray tracing pipeline 300 determines which triangles those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for $O_4$ unless that triangle had an any hit shader or intersection shader that, when executed, indicated that ray 1 did not hit that triangle. In that situation, the ray tracing pipeline 300 would run the closest hit shader for $O_1$ unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with $O_2$ and $O_4$, executes an any hit and/or an intersection shader for those triangles if specified by the material, and runs the appropriate closest hit or miss shader. For rays 3 and 4, the ray tracing pipeline 300 determines intersections as shown (ray 3 intersects $O_3$ and $O_7$ and ray 4 intersects $O_5$ and $O_6$, executes appropriate any hit and/or intersection shaders, and executes appropriate closest hit or miss shaders based on the results of the any hit and/or intersection shaders.

A bounding volume hierarchy, such as the BVH 404, includes data that defines the various nodes, including the leaf nodes and non-leaf nodes, and associated information, such as the geometry of the boxes associated with non-leaf nodes, the geometry of the triangles associated with the leaf nodes, and other information. It is possible for the amount of data in a BVH 404 to span multiple memory pages, such as for very large BVHs that hold geometry for a very large scene. In one example, a video game application includes one or more "levels" including geometry such as terrain, props, and other geometry. In such an example, the BVH 404 for a whole level is calculated "offline," meaning at application development time and not during runtime. This action removes the necessity to recalculate the BVH 404 as a player character traverses the level. However, the amount of data for the BVH 404 is very large.

Because large BVHs 404 are used, it is possible that not all of a BVH 404 is stored in readily accessible memory such as caches, APD memory, or other memory at any given time. Accessing certain portions of a BVH 404 could therefore sometimes result in unacceptable pauses in execution, for example, in the event that an application waits for the accessed portion of a BVH 404 to become available before proceeding with other work. For the above reasons, techniques are provided herein that facilitate handling of BVHs 404 that have memory pages that are not readily available upon being accessed.

Figure 5:
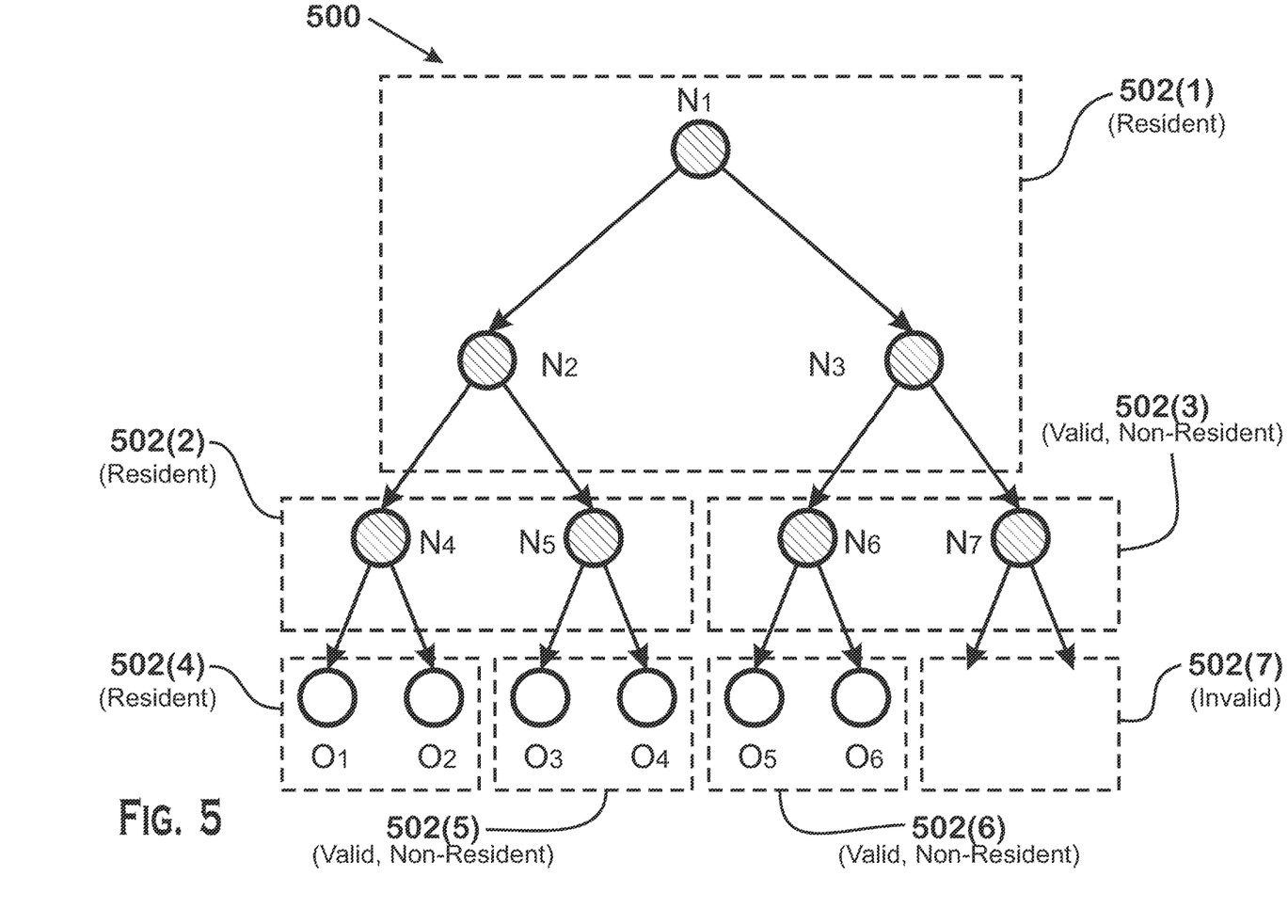
FIG. 5 illustrates a bounding volume hierarchy ("BVH"), according to an example.

FIG. 5 illustrates a BVH 500 having different BVH memory pages 502, according to an example. The BVH memory pages 502 are indicated as being resident, being valid and non-resident, or being invalid. A valid BVH memory page 502 is a BVH memory page 502 for which the virtual address of the memory page has a valid physical address translation. A valid BVH memory page 502 is also considered a resident BVH memory page 502 (and a resident BVH memory page 502 is considered a valid memory page). A valid, non-resident memory page is a BVH memory page 502 whose virtual memory address has a valid physical address translation but that is not considered resident. An invalid BVH memory page 502 is a BVH memory page having a virtual memory page address that does not have a valid address translation. Nodes in a BVH 500 point to other nodes using a virtual memory address—thus nodes include pointers to other nodes. It is possible for a pointer of a node to have an invalid address, for which no translation to a physical address is present in page tables. This pointer would be to an invalid BVH memory page 502. In FIG. 5, such an invalid memory page 502 is shown with no contents, because no data actually exists for that memory page.

A resident memory page is a memory page whose data is stored in a memory that is considered to be readily accessible. The specific memories that are considered to be readily accessible varies in different implementations. In an example, a particular cache memory, such as a level 0 cache memory, is considered "readily accessible" and thus BVH memory pages 502 stored in the level 0 cache memory are considered to be resident. In another example, APD system memory is considered to be "readily accessible" and thus BVH memory pages 502 stored in APD system memory (as well as all memories "closer" to the compute units 132) are considered to be resident. A BVH memory page 502 that is not stored in any readily accessible memory is considered to be non-resident (or not resident). APD system memory is memory that is within the APD 116 and is available for use by any of the compute units 132. It is possible for an application to designate which memory pages are considered resident and which are considered valid and non-resident. It is possible for the data for non-resident memory pages to be in a format that is not compatible with a bounding volume hierarchy. In examples, an application reads such data generates a portion of the BVH from that data, and loads that portion of the BVH into a memory considered resident. Then, the application marks the pages containing that data as resident.

The different designations (referred to as "residency designations") of BVH memory pages 502 as resident, valid and non-resident, or invalid, allows the BVH to be traversed even where the BVH 500 is not fully resident, and without waiting for loading the BVH memory pages into a memory considered readily accessible. More specifically, when a BVH traversing entity, such as a compute unit 132 executing a shader program to traverse the BVH 500, the BVH traversing entity does so using virtual addresses of the BVH memory pages 502. The traversing entity provides such virtual addresses to the MMU 150 for translation. The MMU 150 consults stored translations (such as in a TLB and/or in one or more page tables) to determine the physical address of the pages and the residency designation for the BVH memory pages 502, and returns these values to the traversing entity.

For BVH memory pages 502 that are resident, the traversing entity processes the contents of such memory pages 502 as normal (i.e., as described with respect to FIG. 4, traversing through box nodes that a ray intersects until one or more triangles are found, and performing an intersection test on such one or more triangles).

For BVH memory pages 502 that are valid and non-resident, the traversing entity treats the contents of such BVH memory pages 502 as if a miss occurs for all such contents. In an example, the BVH memory page 502 includes box nodes but not triangle nodes. In such an example, the traversing entity would treat all such box nodes as if the ray missed those nodes. Thus, the traversing entity would not traverse to any children of such box nodes, and would not record a hit for any of the triangles that are the ultimate children of such box nodes, even if the ray would actually hit the node if the data were resident and an intersection test against such triangles could take place.

For BVH memory pages 502 that are invalid, the MMU 150 generates a fault that is handled by a fault handler (such as an operating system executing in the processor 102). Such a fault represents that the virtual address referring to a particular BVH memory page 502 does not refer to a valid memory page and thus that the BVH 500 includes an invalid memory address.

By treating the contents of valid, non-resident BVH memory pages 502 as misses, instead of waiting until the contents of such memory pages have been loaded into a readily accessible memory, operations involving ray tracing are able to proceed. Triangles represented by non-resident portions of the BVH 500 are simply not displayed.

Figure 6:
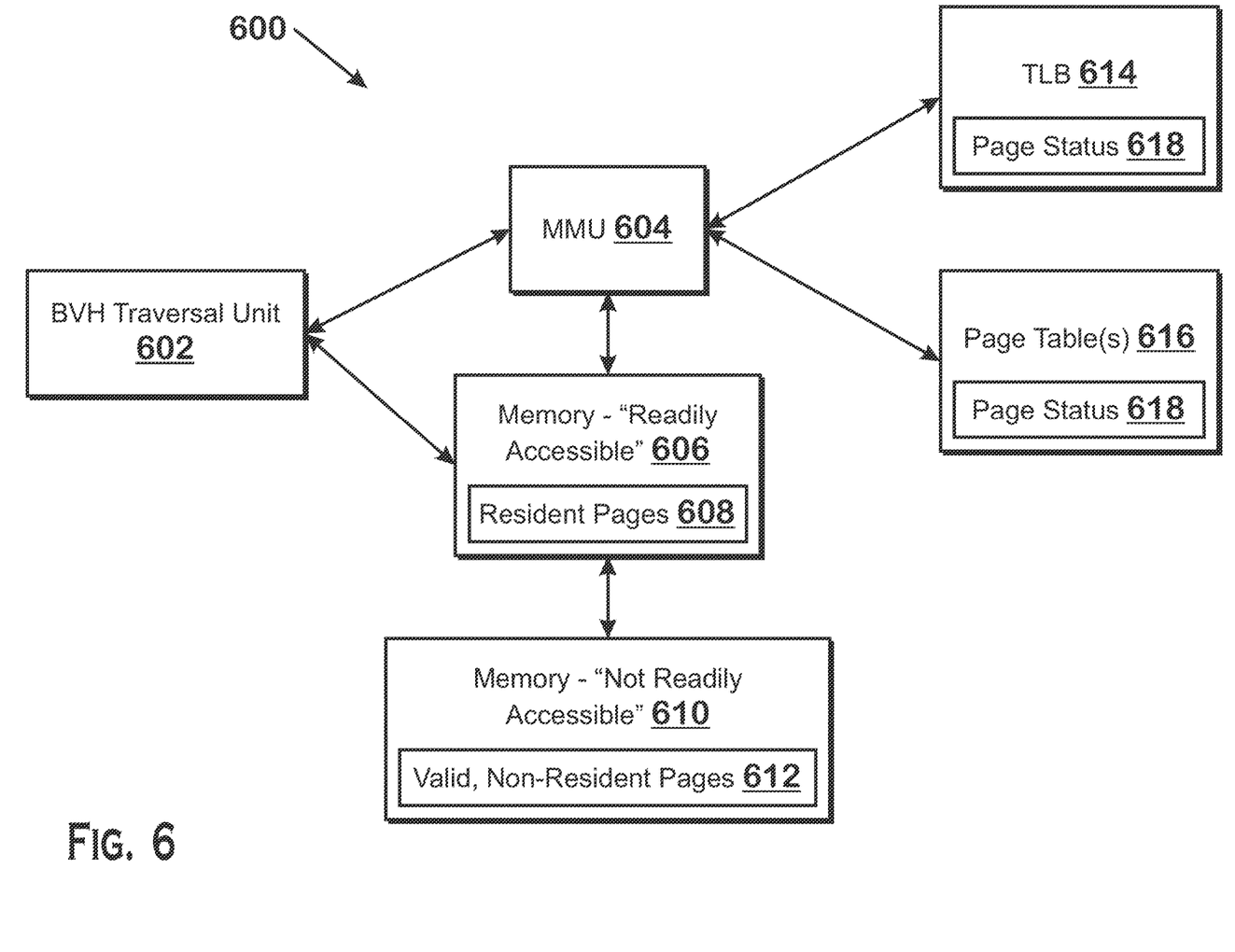
FIG. 6 is a block diagram of a system that performs ray tracing using a partially resident BVH, according to an example.
Figure 7:
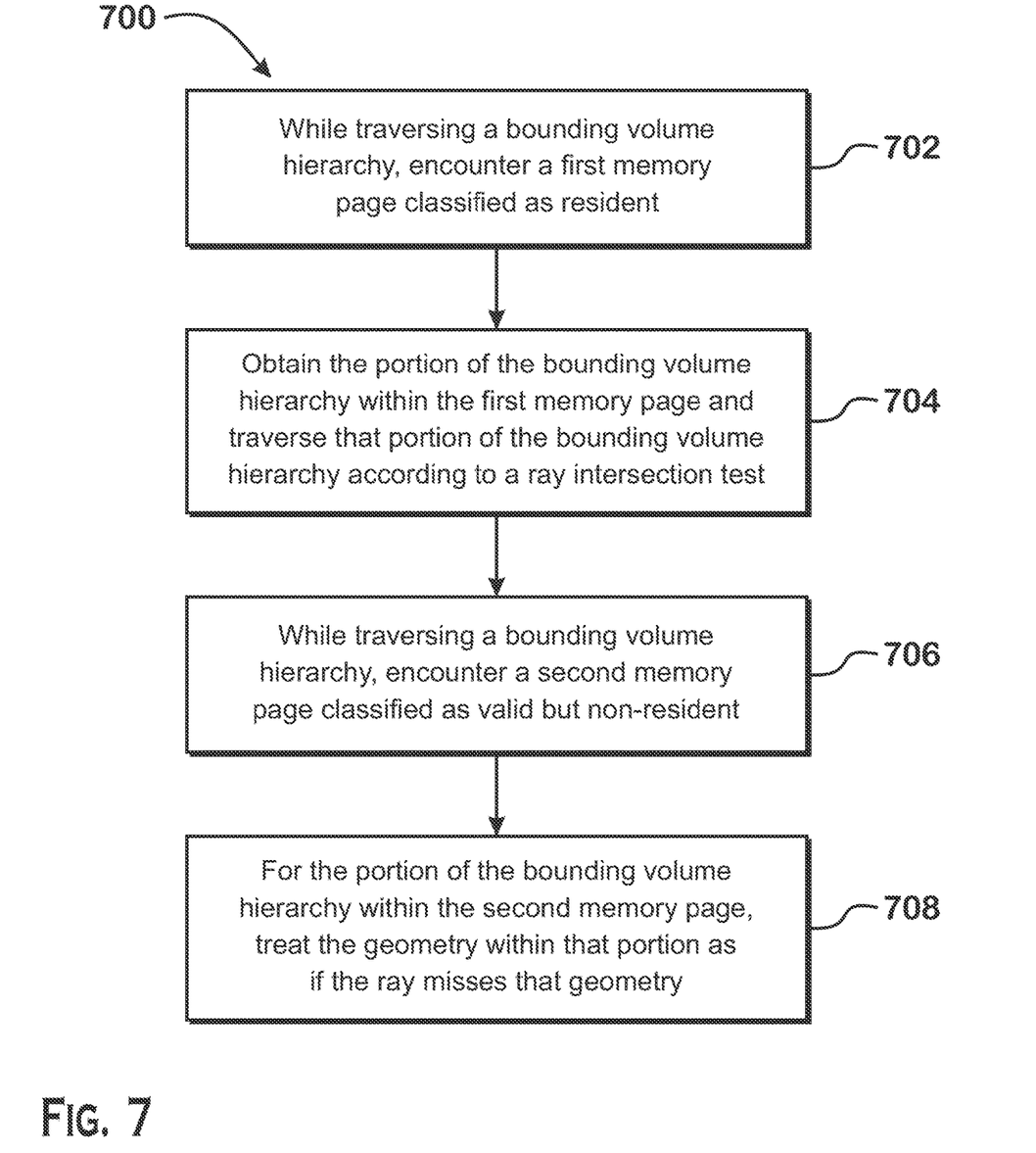
FIG. 7 is a flow diagram of a method for performing ray tracing using a partially resident bounding volume hierarchy, according to an example.

FIG. 6 illustrates an example system in which techniques of this disclosure are implemented. FIG. 7 is a flow diagram of a method 700 for performing ray tracing using a partially resident bounding volume hierarchy, according to an example. Although described with respect to the system of FIGS. 1-6, those of skill in the art will understand that any system, configured to perform the steps of the method 700 in any technically feasible order falls within the scope of the present disclosure. FIGS. 6 and 7 will now be discussed in conjunction.

FIG. 6 is a block diagram of a system 600 that performs ray tracing using a partially resident BVH, according to an example. The system 600 includes a BVH traversal unit 602, a memory management unit ("MMU") 604, a memory deemed "readily accessible" 606, which includes resident BVH pages 608, a memory deemed "not readily accessible"

610, which includes valid, non-resident BVH pages 612, a translation lookaside buffer 614, and one or more page tables 616.

The BVH traversal unit 602 is an entity that performs a ray intersection test. In various examples, the BVH traversal unit 602 is a shader program executing on a compute unit 132, an application executing on the processor 102, or any other entity, such as a program executing on a processor, a hardware circuit configured to perform ray intersection tests, or a combination of software and hardware.

In some examples, the MMU 604 is the MMU 150 of the APD 116. In other examples, the MMU 604 is a different MMU. The MMU 604 provides address translation services, translating virtual addresses to physical addresses. The MMU 604 also indicates to the BVH traversal unit 602 whether a BVH memory page 502 is resident or non-resident but valid. In some configurations, the MMU 604 also indicates whether a BVH memory page 502 is invalid.

The BVH traversal unit 602 is communicatively coupled to readily accessible memories 606. As described elsewhere herein, readily accessible memories 606 are those memories deemed to store resident BVH pages 608. By contrast, not readily accessible memories 610 are those memories deemed to store valid, non-resident memory pages 612. It is possible for the data of the valid, non-resident memory pages 612 to be in a form that is not immediately suitable for use as part of a BVH. It is possible for data corresponding to valid, non-resident memory pages 612 to be in the same memory as resident memory pages 608, but for an application to indicate that the data corresponding to the non-resident memory pages 612 are non-resident nonetheless. In an example, an application stores raw geometry (e.g., triangles) in system memory along with resident memory pages 612 of a BVH. At this point, the memory pages corresponding to the raw geometry are indicated as being valid but non-resident in the page tables. The application processes the raw geometry to generate portions of the BVH and indicates to the operating system that the portions of the BVH are now within resident memory pages. The operating system would then modify the page table to indicate that those memory pages are resident instead of valid and non-resident.

In various implementations, the information regarding the classification of the BVH memory pages 502—shown as the page status 618—is stored in page tables 616, which is read into the TLB 614 for use by the MMU 604. The entity that writes the page tables 616, such as an operating system executing on the processor 102, writes this page status 618 into the page tables 616. In various implementations, information indicating which memories are considered readily accessible and which memories are considered not readily accessible is stored for reference by the entity that writes the page tables 616 (such as an operating system executing on the processor 102). The entity references that location as memory pages are migrated between memories to update the page status 618. In some examples, an application indicates to the operating system which memory pages are resident and which memory pages are valid and non-resident.

Reference is now made to FIGS. 6 and 7 together. The method 700 begins at step 702, where the BVH traversal unit 602 is traversing a BVH 500. While traversing the BVH 500, the BVH traversal unit 602 encounters a first BVH memory page 502 that is classified as resident. At step 704, the BVH traversal unit 602 obtains the portion of the BVH 500 within the first BVH memory page 502 and traverses the portion of the BVH 500 represented in the first BVH memory page.

At step 706, while traversing the BVH 500, the traversal unit 602 encounters a second memory page that is classified as valid but non-resident. At step 708, the BVH traversal unit 602 treats the geometry within the second memory page as if the ray misses that geometry. For a box node, the BVH traversal unit 602 treats each triangle that is the descendant of such box node as if a miss had occurred. Specifically, the BVH traversal unit 602 does not execute a hit shader ("executes no hit shader") for that triangle. For a triangle, the BVH traversal unit 602 treats such a triangle as if the ray misses that triangle.

An example traversal through the BVH 500 of FIG. 5, using the method 700 of FIG. 7, is now described. In this example, a ray is tested against the BVH 500 for intersection with triangles. The ray intersects triangle $O_3$, but not any other triangle. The BVH traversal unit 602 begins at the root node, $N_1$. $N_1$ is in a resident page, so the BVH traversal unit 602 obtains the data for $N_1$, performs an intersection test, determines that the ray intersects the space associated with $N_1$, and proceeds with intersection tests against the children of $N_1$: $N_2$ and $N_3$, which are also in a resident memory page. The BVH traversal unit 602 determines that the ray intersects box node $N_2$, but not box node $N_3$. Because a miss for $N_3$ occurs, the BVH traversal unit 602 does not proceed to the children of $N_3$. However, because a hit occurs for $N_2$, the BVH traversal unit 602 proceeds to nodes $N_4$ and $N_5$.

Nodes $N_4$ and $N_5$ are in a different BVH memory page 502(2) than nodes $N_1$, $N_2$, and $N_3$. However, BVH memory page 502(2) is also resident. Thus the BVH traversal unit 602 accesses the data of $N_4$ and $N_5$ normally and proceeds through the BVH 500 from that point. More specifically, node $N_2$ stores the location of nodes $N_4$ and $N_5$ with a pointer—a memory address in a virtual address space. The BVH traversal unit 602 provides this memory address to the MMU 604 for translation. The MMU 604 returns the physical address of nodes $N_4$ and $N_5$, as well as indications that these nodes are in a resident memory page 502(2). Because these nodes are in resident memory pages, the BVH traversal unit 602 evaluates the ray against these nodes instead of treating the nodes as misses.

The BVH traversal unit 602 evaluates the ray against node $N_4$ and determines that there is no intersection. The BVH traversal unit 602 evaluates the ray against node $N_5$ and determines that there is an intersection. Therefore, the BVH traversal unit 602 attempts to access the children of $N_5$, which are triangle nodes $O_3$ and $O_4$, which are in a different BVH memory page 502(5) than the BVH memory page 502(2) of $N_4$ and $N_5$. The BVH traversal unit 602 provides the memory addresses of $O_3$ and $O_4$ to the MMU 604, which returns an indication that the address pointing to memory page 502(5) is a valid address but that the memory page 502(5) is non-resident. In response to the indication that the memory page 502(5) is non-resident, the BVH traversal unit 602 treats both triangle $O_3$ and $O_4$ as misses. Because no other triangles are hit in the BVH, this results in a miss shader being executed, as described with respect to FIG. 4.

Although an example has been described wherein a miss shader is executed because no triangles are hit, it is possible for other triangles to be hit by a ray. More specifically, even where some triangles that would be intersected by a ray are within a non-resident memory page, other triangles are sometimes within resident memory pages. If those triangles are intersected by the ray, then a hit shader is executed for at least one of those triangles and, in some instances, no miss shader is executed.

Each of the units illustrated in the figures represent hardware circuitry configured to perform the operations described herein, software configured to perform the operations described herein, or a combination of software and hardware configured to perform the steps described herein. For example, the acceleration structure traversal stage 304 is implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware. Where a particular stage of the ray tracing pipeline 300 is said to be "invoked," this invocation involves performing the functionality of the hardware if the stage is implemented as hardware circuitry or executing a shader program (or other software) if the stage is implemented as a shader program that executes on a processor.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing for a ray, the method comprising:
   based on first traversal of a bounding volume hierarchy, identifying a first memory page that is classified as resident according to a page table;
   obtaining a first portion of the bounding volume hierarchy associated with the first memory page;
   traversing the first portion of the bounding volume hierarchy according to a ray intersection test;
   based on second traversal of the bounding volume hierarchy, identifying a second memory page that is classified as valid and non-resident according to the page table;
   in response to the second memory page being classified as valid and nonresident, processing as if a miss occurs for each node of the bounding volume hierarchy within the second memory page.

2. The method of claim 1, wherein the first traversal of the bounding volume hierarchy comprises:
   determining that the ray intersects with a first parent node that is a parent of one or more nodes of the first memory page; and
   obtaining a page address for the one or more nodes from within data of the first parent node.

3. The method of claim 2, wherein identifying the first memory page that is classified as resident comprises:
   determining that the page address is indicated as being resident according to the page table.

4. The method of claim 1, wherein the second traversal of the bounding volume hierarchy comprises:
   determining that the ray intersects with a second parent node that is a parent of one or more nodes of the second memory page; and
   obtaining a page address for the one or more nodes from within data of the second parent node.

5. The method of claim 4, wherein identifying the second memory page that is classified as valid and non-resident comprises:
   determining that the page address is indicated as being valid and non-resident according to the page table.

6. The method of claim 1, further comprising:
   based on third traversal of the bounding volume hierarchy, identifying a third memory page that is classified as invalid; and
   generating a fault for the third memory page.

7. The method of claim 1, further comprising:
   in response to determining that the miss occurs for each node of the bounding volume hierarchy within the second memory page, executing no hit shader for any triangle node that is a descendant of any node within the second memory page.

8. The method of claim 1, further comprising:
   in response to determining that processing is to occur as if a miss occurs for each node of the bounding volume hierarchy within the second memory page, executing a miss shader for the ray.

9. The method of claim 1, further comprising:
   updating the status of memory pages of the bounding volume hierarchy based on migration of the memory pages.

10. A system for performing ray tracing for a ray, the system comprising:
    a memory storing memory pages of a bounding volume hierarchy; and a processor configured to:
    based on first traversal of a bounding volume hierarchy, identify a first memory page that is classified as resident according to a page table;
    obtain a first portion of the bounding volume hierarchy associated with the first memory page;
    traverse the first portion of the bounding volume hierarchy according to a ray intersection test;
    based on second traversal of the bounding volume hierarchy, identify a second memory page that is classified as valid and non-resident according to the page table;

in response to the second memory page being classified as valid and nonresident, processing as if a miss occurs for each node of the bounding volume hierarchy within the second memory page.

11. The system of claim 10, wherein the first traversal of the bounding volume hierarchy comprises:
   determining that the ray intersects with a first parent node that is a parent of one or more nodes of the first memory page; and
   obtaining a page address for the one or more nodes from within data of the first parent node.

12. The system of claim 11, wherein identifying the first memory page that is classified as resident comprises:
   determining that the page address is indicated as being resident according to the page table.

13. The system of claim 10, wherein the second traversal of the bounding volume hierarchy comprises:
   determining that the ray intersects with a second parent node that is a parent of one or more nodes of the second memory page; and
   obtaining a page address for the one or more nodes from within data of the second parent node.

14. The system of claim 13, wherein identifying the second memory page that is classified as valid and non-resident comprises:
   determining that the page address is indicated as being valid and non-resident according to the page table.

15. The system of claim 10, wherein the processor is further configured to:
   based on third traversal of the bounding volume hierarchy, identify a third memory page that is classified as invalid; and
   generate a fault for the third memory page.

16. The system of claim 10, wherein the processor is further configured to:
   in response to determining that the miss occurs for each node of the bounding volume hierarchy within the second memory page, execute no hit shader for any triangle node that is a descendant of any node within the second memory page.

17. The system of claim 10, wherein the processor is further configured to:
   in response to determining that processing is to occur as if a miss occurs for each node of the bounding volume hierarchy within the second memory page, execute a miss shader for the ray.

18. The system of claim 10, wherein the processor is further configured to:
   update the status of memory pages of the bounding volume hierarchy based on migration of the memory pages.

19. A non-transitory computer-readable medium storing instructions that, when executed by a processor, cause the processor to perform ray tracing for a ray, by:
   based on first traversal of a bounding volume hierarchy, identifying a first memory page that is classified as resident according to a page table;
   obtaining a first portion of the bounding volume hierarchy associated with the first memory page;
   traversing the first portion of the bounding volume hierarchy according to a ray intersection test;
   based on second traversal of the bounding volume hierarchy, identifying a second memory page that is classified as valid and non-resident according to the page table;
   in response to the second memory page being classified as valid and nonresident, processing as if a miss occurs for each node of the bounding volume hierarchy within the second memory page.

20. The non-transitory computer-readable medium of claim 19, wherein the first traversal of the bounding volume hierarchy comprises:
   determining that the ray intersects with a first parent node that is a parent of one or more nodes of the first memory page; and
   obtaining a page address for the one or more nodes from within data of the first parent node.

* * * * *